US012485067B2

(12) United States Patent
Purewal

(10) Patent No.: US 12,485,067 B2
(45) Date of Patent: Dec. 2, 2025

(54) SUPPORT DEVICE FOR MANUAL THERAPY

(71) Applicant: Pure Life Health Centre Ltd., Surrey (CA)

(72) Inventor: Manvir Singh Purewal, Surrey (CA)

(73) Assignee: Pure Life Health Centre Ltd., Surrey (CA)

( * ) Notice: Subject to any disclaimer, the term of this patent is extended or adjusted under 35 U.S.C. 154(b) by 842 days.

(21) Appl. No.: 17/649,916

(22) Filed: Feb. 3, 2022

(65) Prior Publication Data

US 2022/0249324 A1 Aug. 11, 2022

(30) Foreign Application Priority Data

Feb. 5, 2021 (CA) ................................ CA 3108167

(51) Int. Cl.
*A61F 5/00* (2006.01)
*A61H 99/00* (2006.01)

(52) U.S. Cl.
CPC .................................... *A61H 99/00* (2013.01)

(58) Field of Classification Search
CPC ..................................................... A61F 5/3753
See application file for complete search history.

(56) References Cited

U.S. PATENT DOCUMENTS 4,417,569 A 11/1983 Brudny
4,669,451 A 6/1987 Blauth et al.
6,113,562 A 9/2000 Bonutti et al.
2008/0228118 A1 9/2008 Bull et al.
2020/0038217 A1 2/2020 Purewal et al.

FOREIGN PATENT DOCUMENTS

CN 107789111 A 3/2018

OTHER PUBLICATIONS

International Search Report for PCT/CA2018/051016 mailed Apr. 2, 2019.

*Primary Examiner* — Kim M Lewis
(74) *Attorney, Agent, or Firm* — Rivkin Radler LLP

(57) ABSTRACT

The invention relates to a shoulder joint abduction fixation orthotic device. The shoulder joint abduction fixation orthotic device comprises a forearm support frame, a C-shaped upper arm bracket, an armpit support frame, a line-shaped armpit movable shaft and an adjustable support. The forearm support frame, the C-shaped upper arm bracket and the armpit support frame are integrally formed and used for supporting the forearm, the upper arm and the armpit on one side respectively, the line-shaped armpit movable shaft is arranged between the C-shaped upper arm bracket and the armpit support frame, and the adjustable support with one end connected with the C-shaped upper arm bracket and the other end connected with the armpit support frame is used for adjusting the shoulder joint abduction angle. The shoulder joint abduction fixation orthotic device can effectively overcome the defects of an existing orthotic device and ensure the postoperative effect of shoulder periarticular operations.

14 Claims, 9 Drawing Sheets

FIG. 7
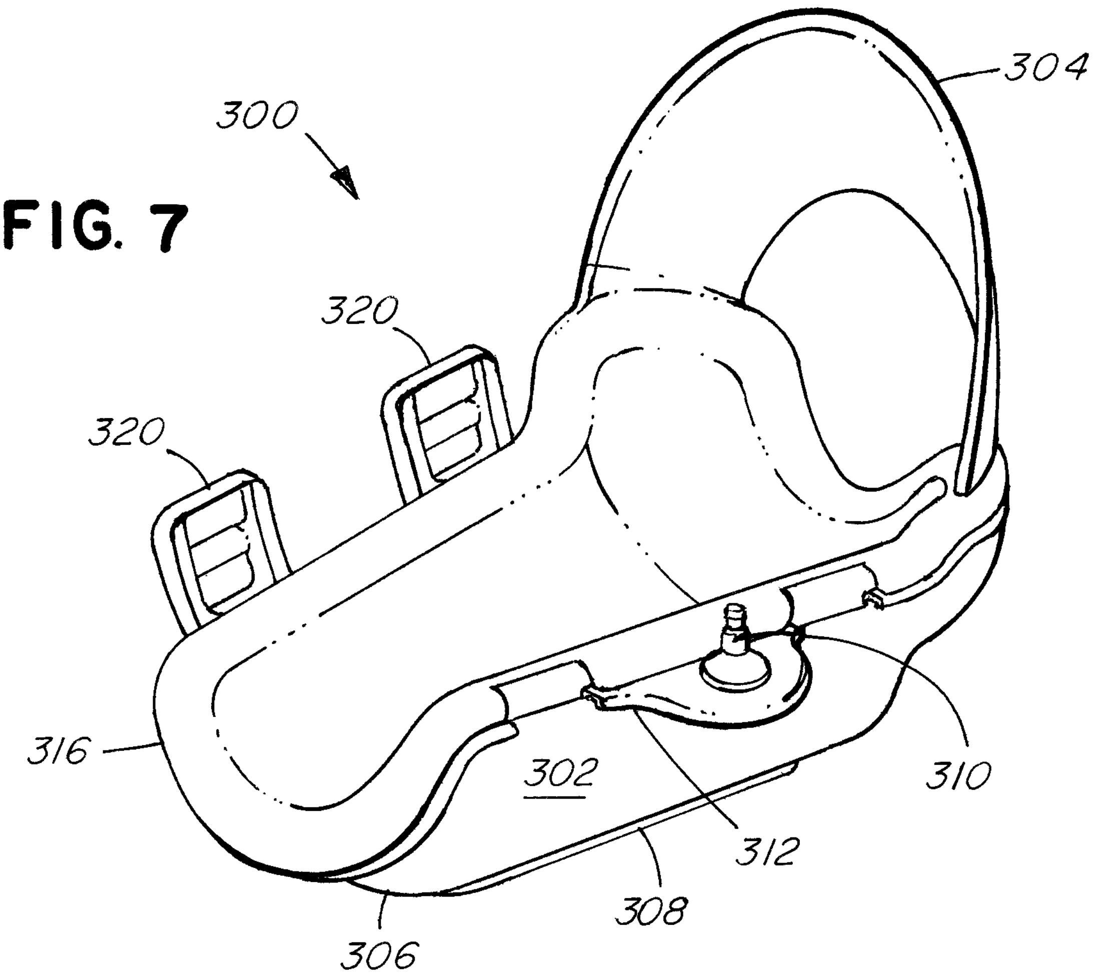
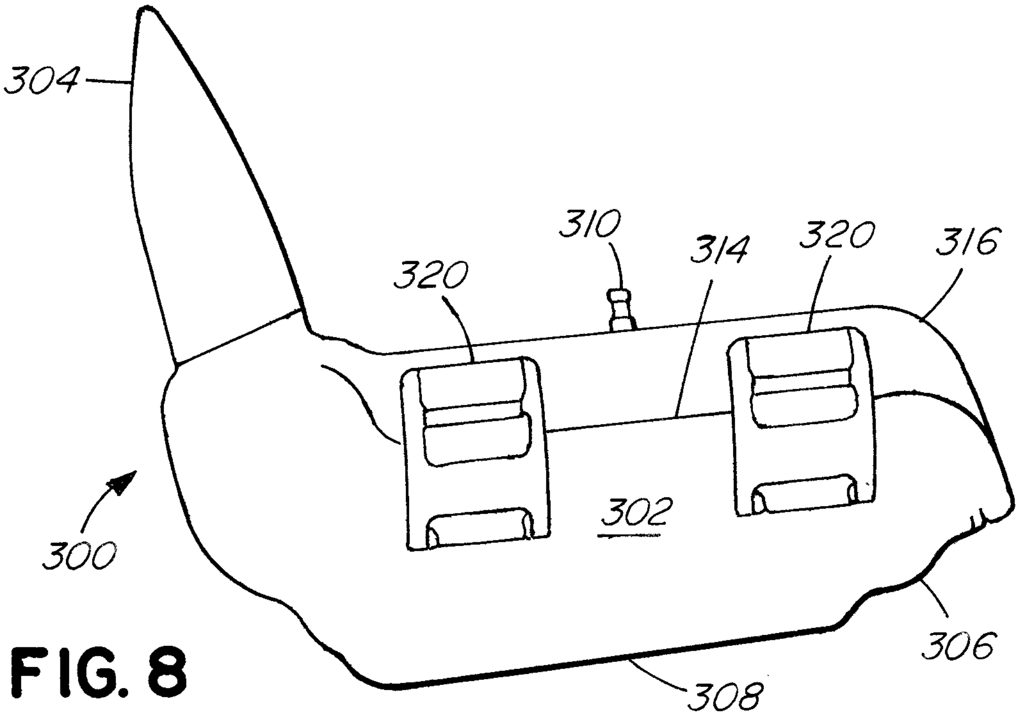
FIG. 8

FIG. 9
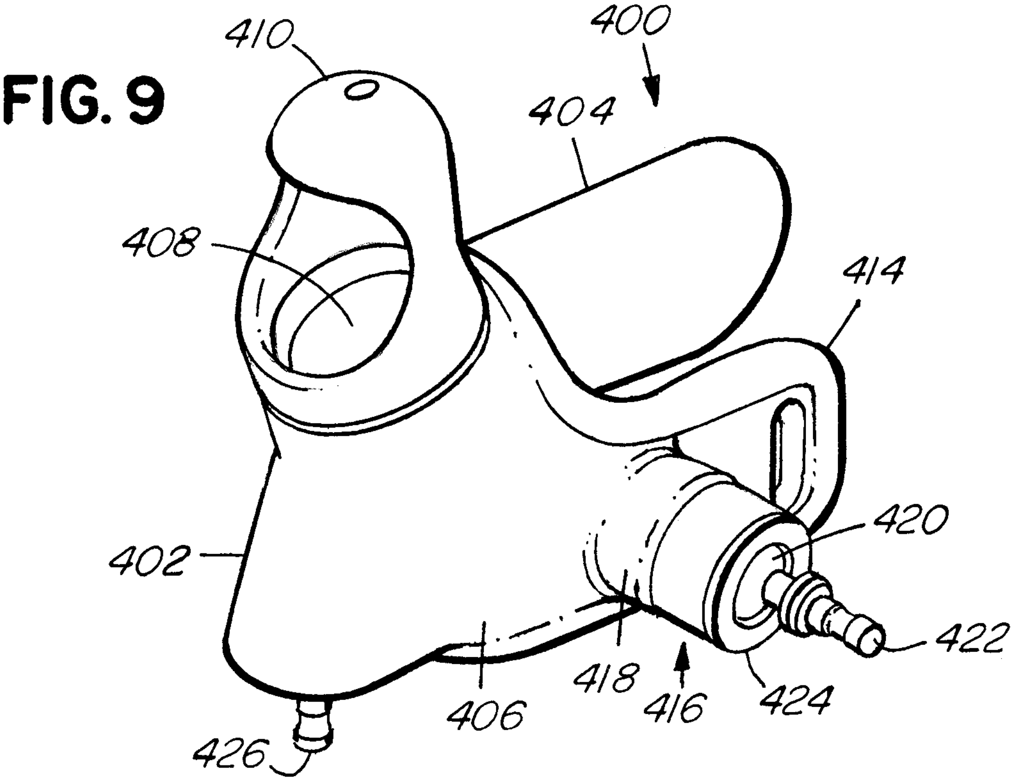
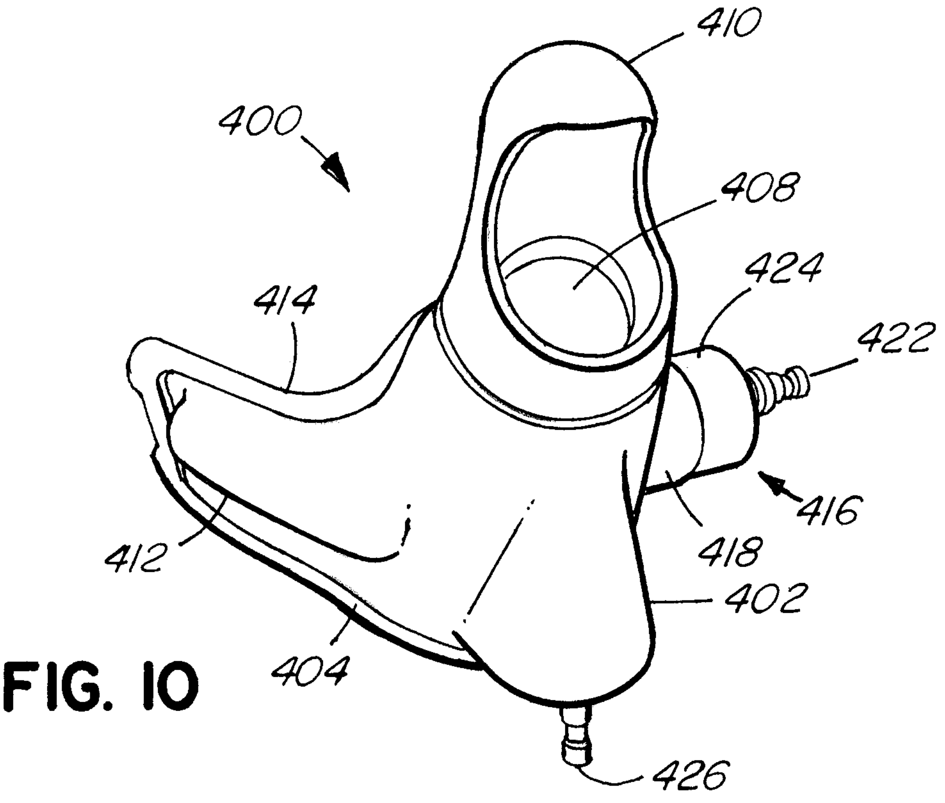
FIG. 10

SUPPORT DEVICE FOR MANUAL THERAPY

CROSS-REFERENCE TO RELATED APPLICATION(S)

The present U.S. non-provisional application claims priority to CANADA Application Serial No. 3108167, filed Feb. 5, 2021, the contents of which are incorporated herein by reference in its entirety.

FIELD OF THE INVENTION

This invention relates to an ergonomic support apparatus for manual therapists. In particular, this invention relates to ergonomic support apparatus for manual therapists allowing manual therapists to apply pressure through an external artificial structure instead of through their own anatomy.

BACKGROUND OF THE INVENTION

Manual therapy refers to a broad class of treatment of ailments and conditions through physical manipulation of a patient's body and in particular the soft tissues. Manual therapy may include treatments such as physiotherapy, physical therapy, and massage therapy.

In some forms of manual therapy, the manual therapist delivers force or pressure to targeted portions of the patient's anatomy. Conventionally, this is often effected by the manual therapist applying a portion of his or her body weight to the patient through the manual his or her arms. Depending upon the desired treatment, the pressure of this portion of his or her body weight may be transferred through different structures of the arm, including, but not limited to, the forearm, palm, and digits, in particular the thumb.

Over time and across multiple patients, the repeated application of pressure by the manual therapist can lead to various repetitive stress injuries and soft tissue injuries in the manual therapist's arms. The soft tissues surrounding the elbow, wrist, and thumb of the manual therapist are particularly prone to such injuries, although the shoulder and other digits may also be susceptible. This is in part due to the anatomical structures of the arm being ill-suited to supporting significant amounts of force in the bent positions often required for the effective delivery of manual therapy. Accordingly, it would be advantageous if the manual therapist's arms could be supported during manual therapy.

US Patent Application Publication No. US 2020/0038217 A1 to Purewal and Kelly discloses an external support apparatus for manual therapists comprising a rigid forearm support terminating at the distal end in a wrist pressure pad or thumb support, an upper arm support which wraps around the therapists upper arm and terminates proximally in a cushion pad which is positioned in the therapist's axilla or armpit, and an interlock mechanism located proximate to the therapist's elbow which locks the forearm and upper support together into a unitary rigid support when the therapists arm is extended. However, this support apparatus has several limitations. First, this support apparatus does not provide any support if the manual therapists arm is bent, meaning that potential for repetitive stress injuries remains when the manual therapist delivers pressure with a bent arm, such as through the medial edge of his or her forearm. Second, the effective dimensions of this support apparatus are heavily dependent on the anatomical proportions of the manual therapist, meaning that the support apparatus must be custom-designed for each individual manual therapist, thereby substantially increasing the cost of the support apparatus.

Third, this support apparatus requires the manual therapist to direct his or her weight through his or her armpit and into the cushion pad of the upper arm support. This places reactionary strain on the manual therapist's shoulder joint, and due to the relatively small area of the armpit and the overall mobility of the shoulder joint, may cause chafing and discomfort over extended periods of use, similar to how crutches are uncomfortable to use for extended periods.

It is therefore an object of this invention to provide an external support apparatus for manual therapists to reduce the occurrence of repetitive stress injuries and other soft tissue injuries.

It is a further object of the invention to provide an improved external support apparatus which provides for support across a greater range of treatment modes, is more universally adjustable to account for the anatomy of different manual therapists, and is more comfortable to use for extended periods.

These and other objects will be better understood by reference to this application as a whole. Not all of the objects are necessarily met by all embodiments of the invention described below or by the invention defined by each of the claims.

SUMMARY OF THE INVENTION

The invention is generally a partial exoskeleton comprising a thoracic support, a therapeutic support, and an interconnecting strut or rod between the thoracic is support and the therapeutic support that allows a manual therapist to use various portions of his or her arm to target therapeutic pressure but to apply the therapeutic pressure through the thoracic support, interconnecting strut, and therapeutic support instead of through his or her arm.

In one aspect, the invention is a support apparatus comprising a thoracic support adapted to attach to the manual therapist's chest over the pectoral and axillary regions, a forearm support adapted to wrap around the manual therapist's forearm, and a strut interconnecting the thoracic support to the forearm support. The strut preferably connects to the thoracic support by a ball joint to allow the manual therapist freedom across a range of motion in positioning the forearm support. The forearm support comprises a therapeutic surface positioned substantially over the manual therapist's ulna and preferably further comprises a protruding therapeutic tool for more targeted pressure application. The forearm support also comprises an elbow loop which wraps around the manual therapist's bent elbow to maintain the forearm support in the correct position on the manual therapist's forearm. The strut preferably connects to the forearm support rigidly to ensure force is transmitted efficiently to the therapeutic surface of the forearm support. The strut is preferably telescopically extendible to accommodate the anatomical dimensions of individual manual therapists. Each end of the strut preferably further comprises quick connect fittings to allow the manual therapist to rapidly release the forearm support for straightening his or her arm and for changing therapeutic supports.

In another aspect, the invention is a support apparatus comprising the thoracic support, a hand support adapted to wrap around the manual therapist's hand, and the strut interconnecting the hand support to the thoracic support. The hand support comprises a protruding palmar therapeutic tool and a therapeutic thumb splint tool. The hand support also comprises at least two attachment points to connect the hand support to the strut in either of a palmar mode or a thumb mode. The palmar attachment point is preferably a ball joint to allow the manual therapist to move his or her wrist across a range of motion to position the palmar therapeutic surface, The thumb attachment point is preferably rigid to ensure force is transmitted efficiently to the therapeutic thumb splint tool when using the hand support in the thumb mode. Advantageously, the quick connect fittings of the strut described above allow the manual therapist to rapidly swap between the palmar mode and thumb mode.

In another aspect of the invention, a support apparatus for manual therapy comprises a thoracic support, a forearm support, the forearm support comprising an ulnar therapeutic surface, and a strut interconnecting the thoracic support to the forearm support. The strut transfers a force applied to the thoracic support through the forearm support to the ulnar therapeutic surface.

In a further aspect, the thoracic support is configured to temporarily attach to a user's torso proximate to the user's axilla.

In a still further aspect, the force is a portion of the user's body weight.

In another further aspect, the forearm support is configured to temporarily attach to a user's forearm.

In another further aspect, the ulnar therapeutic surface further comprises an ulnar therapeutic tool.

In a still further aspect, the strut transfers the force through the forearm support to the ulnar therapeutic tool.

In another further aspect, the strut releasably connects to the thoracic support.

In another further aspect, the thoracic support further comprises a thoracic ball joint.

In a still further aspect, a first end of the strut connects to the thoracic ball joint.

In a yet further aspect, the first end of the strut releasably connects to the thoracic ball joint.

In another further aspect, the strut releasably connects to the forearm support.

In another further aspect, the forearm support further comprises an elbow loop.

In another aspect of the invention, a support apparatus for manual therapy comprises a thoracic support, a hand support, and a strut. The hand support comprises a palmar therapeutic tool, a digital therapeutic tool, a first attachment means, and a second attachment means. The strut selectively interconnects the thoracic support to the first attachment means or the second attachment means of the hand support. The strut transfers a force applied to the thoracic support through the hand support to the palmar therapeutic tool when the strut is connected to the first attachment means, and the strut transfers the force through the hand support to the digital therapeutic tool when the strut is connected to the second attachment means.

In a further aspect, the thoracic support is configured to temporarily attach to a user's torso proximate to the user's axilla.

In a still further aspect, the force is a portion of the user's body weight.

In another further aspect, the hand support is configured to temporarily attach to a user's hand.

In another further aspect, the thoracic support further comprises a thoracic ball joint.

In a still further aspect, a first end of the strut connects to the thoracic ball joint.

In a yet further aspect, the first end of the strut releasably connects to the thoracic ball joint.

In another further aspect, the first attachment means comprises a hand ball joint.

In a still further aspect, a second end of the strut connects to the hand ball joint.

In another further aspect, the digital therapeutic tool is configured to partially enclose a user's thumb.

In another further aspect, the hand support substantially immobilizes a user's thumb carpometacarpal joint relative to the user's hand.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIG. 7 is a side perspective view of the forearm support of the support apparatus shown in FIG. 1, with the straps removed for clarity;

FIG. 8 is a front view of the forearm support shown in FIG. 7;

FIG. 9 is a top perspective view the hand support of the support apparatus shown in FIG. 2 with the straps removed for clarity;

FIG. 10 is a bottom perspective view of the hand support shown in FIG. 9;

DETAILED DESCRIPTION OF AT LEAST ONE MODE FOR CARRYING OUT THE INVENTION IN TERMS OF EXAMPLE(S)

Figure 1:
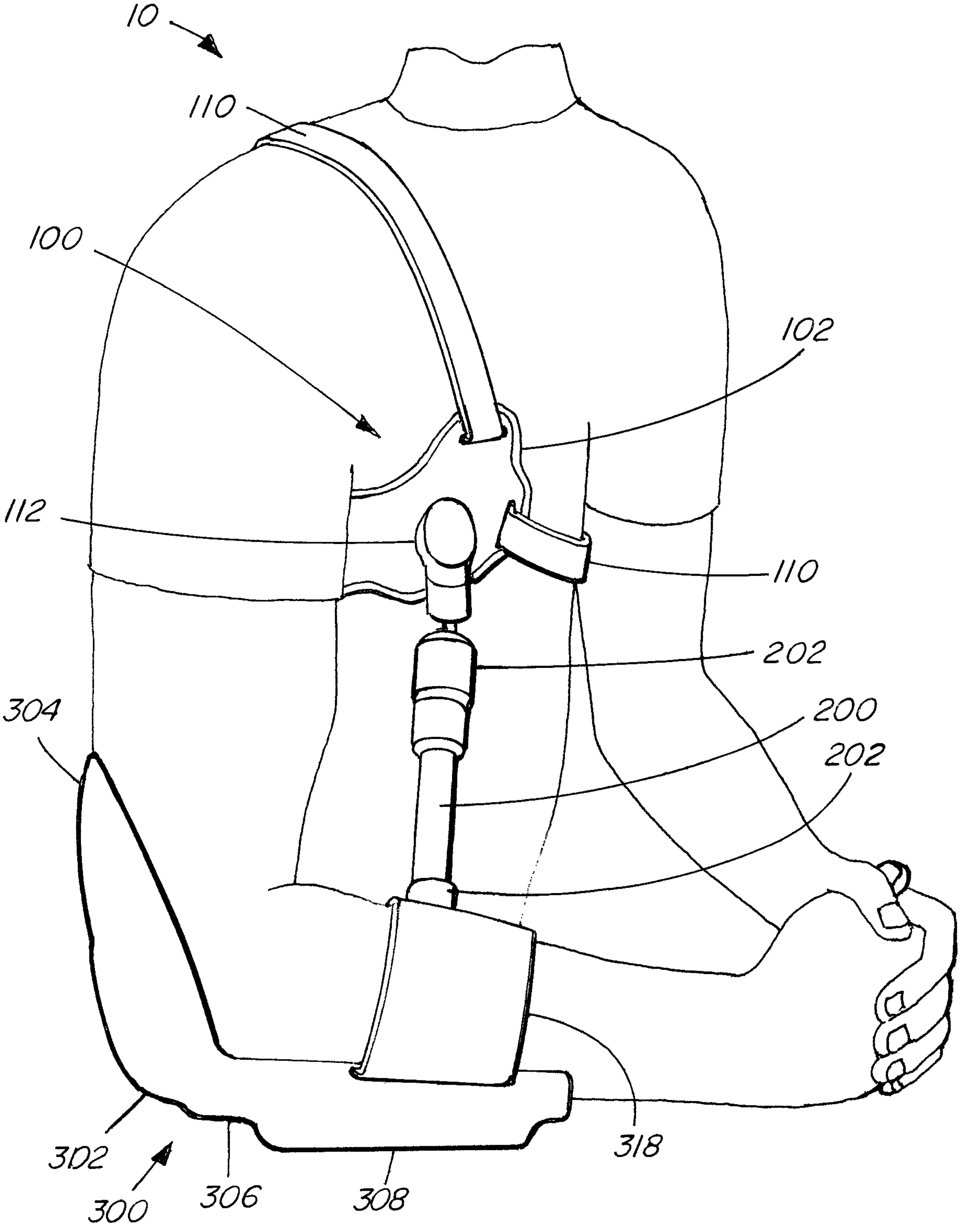
FIG. 1 is a perspective view of a support apparatus according to a first embodiment of the invention showing a thoracic support, a strut, and a forearm support.
Figure 2:
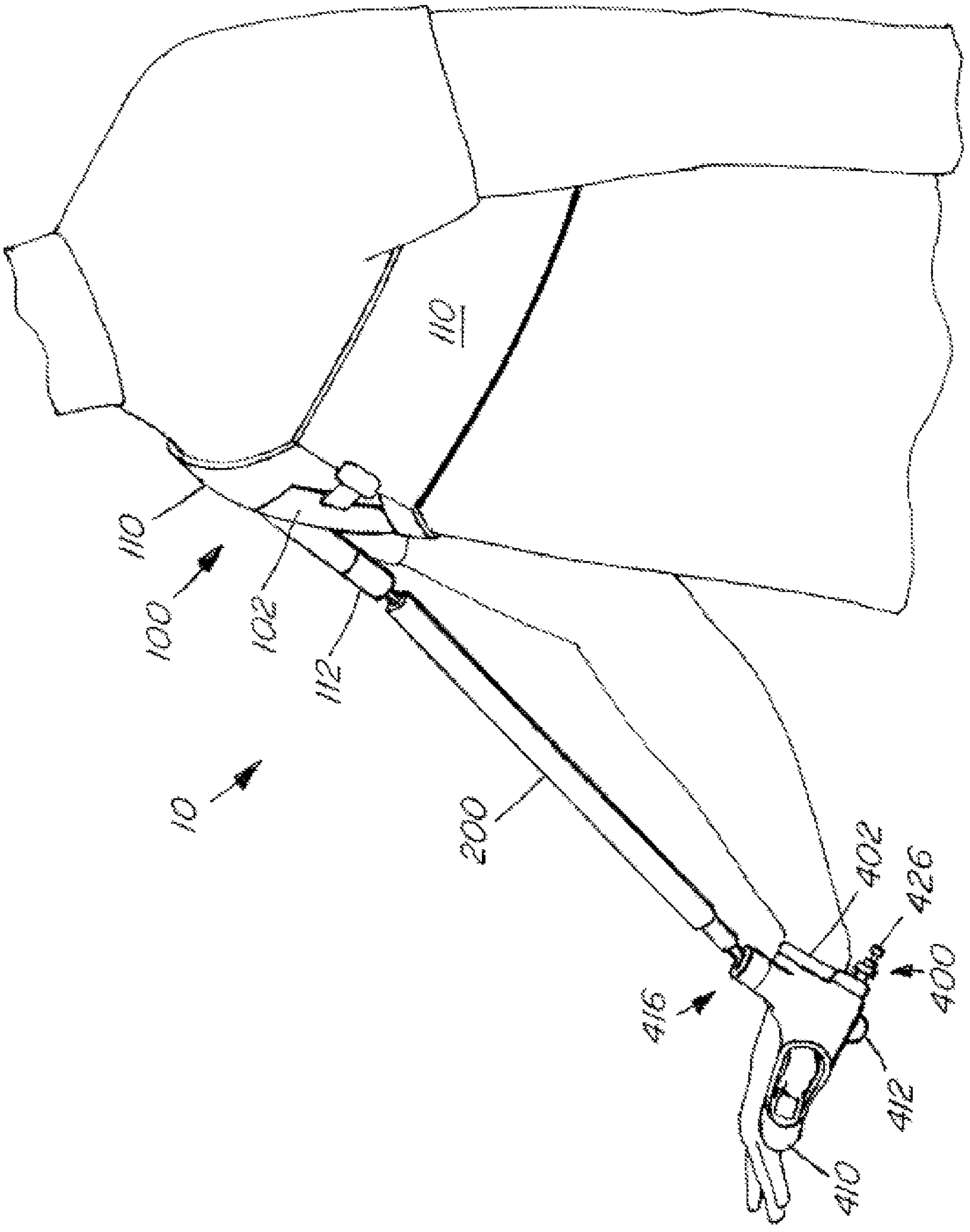
FIG. 2 is a perspective view of a support apparatus according to a second embodiment of the invention showing a thoracic support, a strut, and a hand support being used in a palmar mode.
Figure 3:
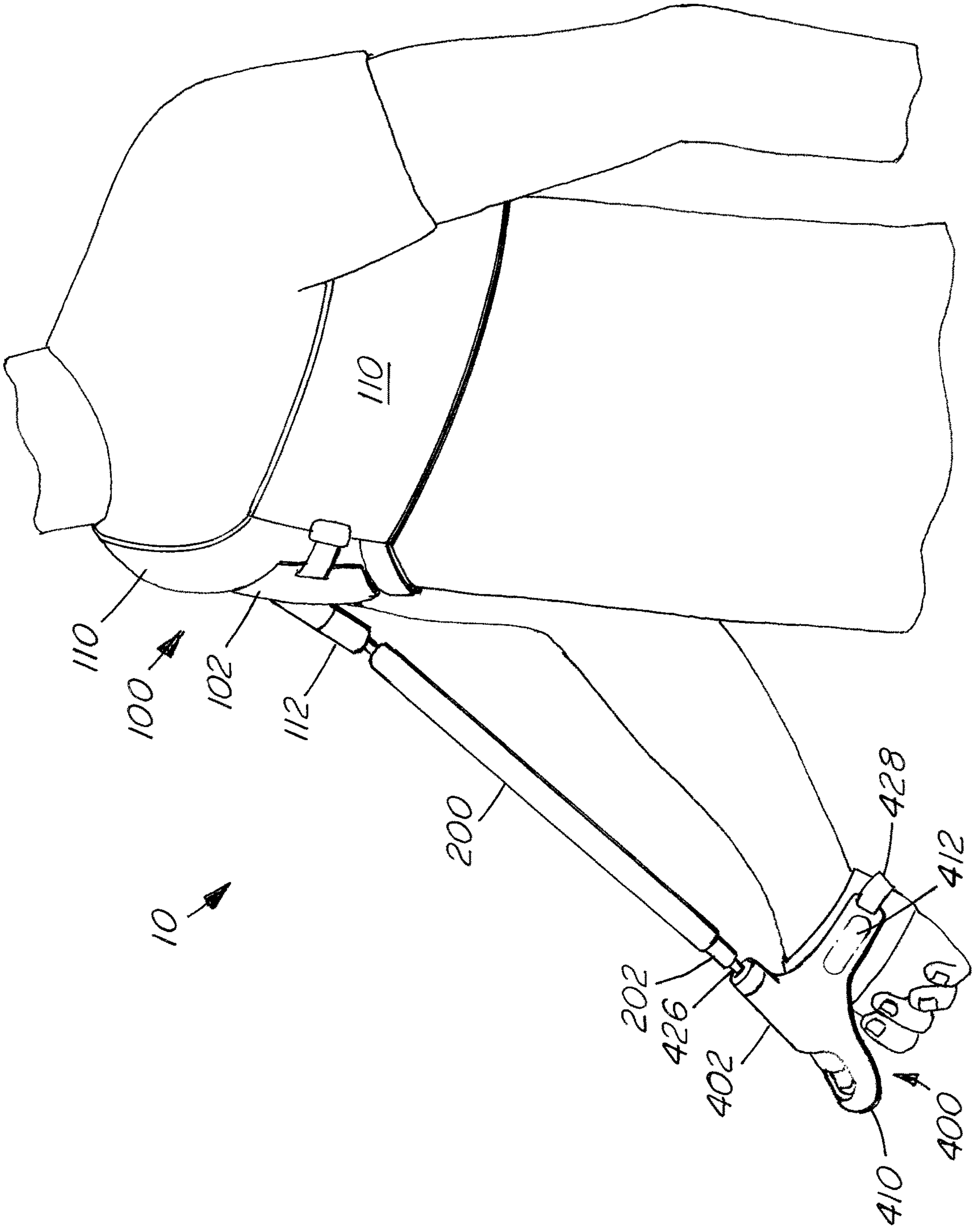
FIG. 3 is a perspective view of a support apparatus according to a third embodiment of the invention showing a thoracic support, a strut, and a hand support being used in a thumb mode.

Referring to FIGS. 1-3, a manual therapy support apparatus 10 generally comprises a thoracic support 100 connected to a rigid strut 200, which is in turn connected to a therapeutic support. In some embodiments, the therapeutic support comprises a forearm support 300 as shown in FIG.

1. In other embodiments, the therapeutic support comprises a hand support 400 as shown in FIGS. 2-3.

Figure 4:
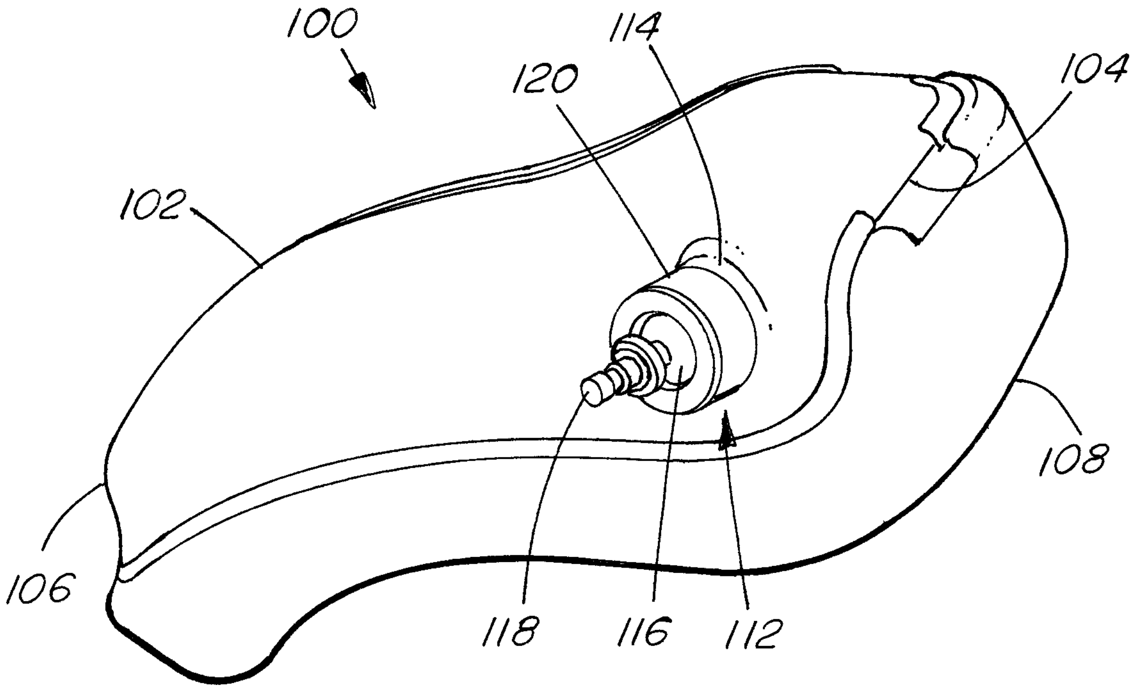
FIG. 4 is a bottom perspective view of the thoracic support of the support apparatuses shown in FIGS. 1-3, with the harness removed for clarity.
Figure 5:
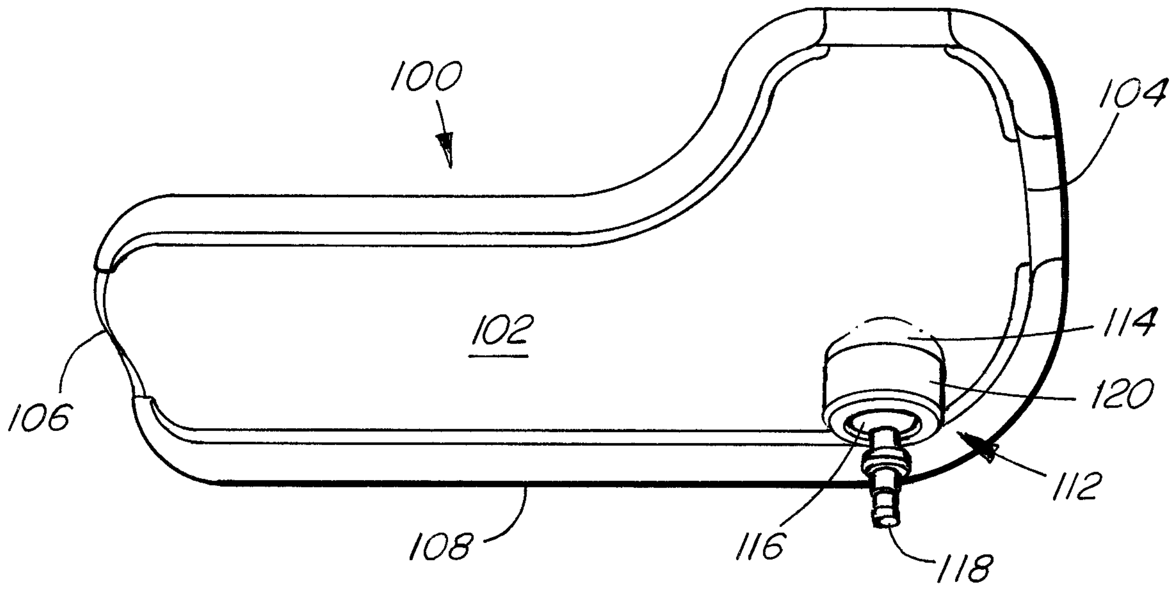
FIG. 5 is a front view of the thoracic support shown in FIG. 4.

Referring to FIGS. 4 and 5, the thoracic support 100 comprises a rigid, curved chest plate 102 having a broadened pectoral end 104 and a narrower axillary end 106. The curvature of chest plate 102 substantially follows the curvature of a user's torso such that when the pectoral end 104 is positioned over a portion of the user's chest, the axillary end 106 lies under and adjacent to the user's armpit, as can be seen in FIG. 1. The overall surface area and curvature of the chest plate 102 evenly distributes the user's weight across the chest plate 102 as the user leans into the support apparatus 10, allowing the support apparatus 10 to be used comfortably over long periods of time. To further enhance the user's comfort, the thoracic support 100 is preferably lined with a firm but compressible backing pad 108 that lies against the user's torso when the support apparatus 10 is used.

A thoracic ball joint 112 is preferably provided on the thoracic support 100 as a connection means between the thoracic support 100 and the strut 200. The thoracic ball joint 112 comprises a first socket 114 situated on the chest plate 102 proximate to the pectoral end 104 and a first ball shank 116 retained in the socket 114 and having a thoracic quick-connect nipple 118, which attaches to the strut 200 as described below. The thoracic ball joint 112 is preferred as a connection means for the strut 200 because it allows the user a wide range of motion over which the user can reposition the therapeutic support attached to the user's arm, while still effectively transferring the user's weight from the thoracic support 100 to the strut 200. It will be appreciated that other joints and connection means are possible. The thoracic ball joint 112 preferably further comprises a first locking collar 120 that, when tightened, squeezes the periphery of the socket 114 inward to clamp the first ball shank 116 in a given orientation. The first locking collar 120 thus selectively locks the strut 200 at a pre-selected angle relative to the thoracic support 200, which may be helpful when, for example, pressure needs to be delivered at a specific location and angle on the patient's body, or when especially high pressure must be applied.

The thoracic support 108 preferably further comprises a harness 110, best seen in FIGS. 1-3, which removably attaches the thoracic support 100 to the user's torso by encircling the user's torso, and in some embodiments over at least one of the user's shoulders, thereby maintaining the chest plate 102 in the correct position during use as shown in FIGS. 1-3. In some embodiments, the harness 110 may be elastic in order to adjust for different users. In other embodiments, the harness 110 may incorporate adjustment means such as, but not limited to, buckles, hook-and-loop fasteners, and the like. Additionally, the harness 110 may have two shoulder straps, similar to a backpack, with rear and/or front adjusting straps between the two shoulder straps for adjusting for the size and shape of the user's body.

Figure 6A:
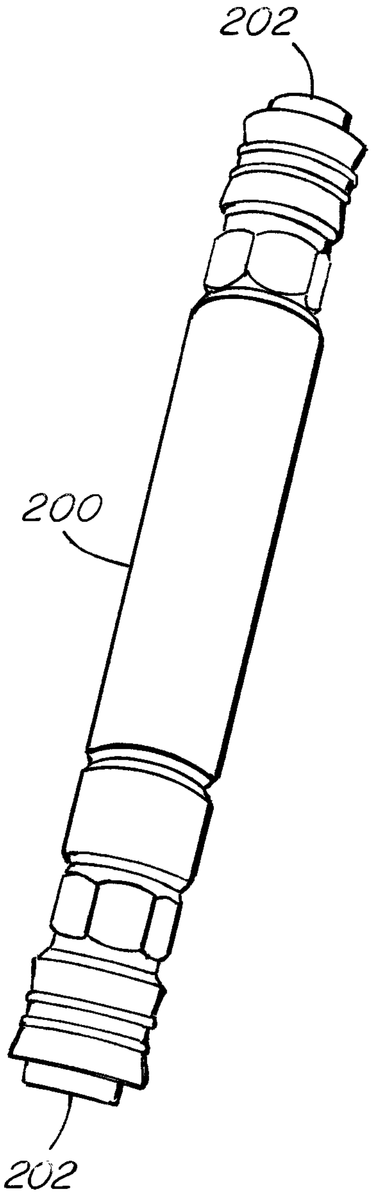
FIG. 6A is a front view of the strut of the support apparatuses shown in FIGS. 1-3 in its retracted state.
Figure 6B:
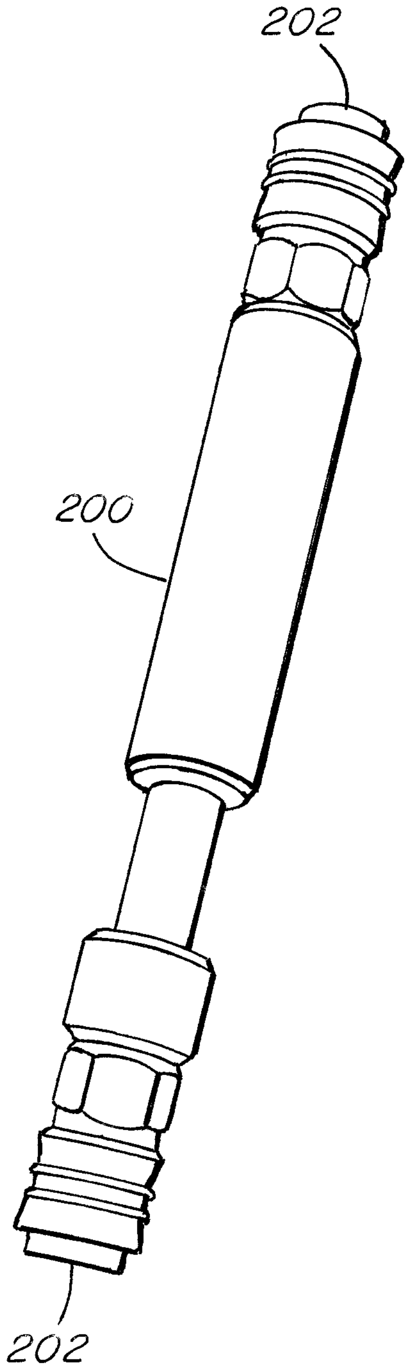
FIG. 6B is a front view of the strut shown in FIG. 6A in its extended state.

Referring to FIGS. 6A-6B, the strut 200 is preferably a rigid, telescopically extendible rod. Advantageously, the telescopically extendible strut 200 allows the support apparatus 10 to be adjusted for users of different anatomical proportions as well as be adjusted according to the demands of various physical manipulations that the user may need to perform. Each end of the strut 200 preferably terminates in a female quick connect fitting 202 adapted to couple with each of the thoracic quick-connect nipple 118 on the thoracic support 100, a forearm quick-connect nipple 310 on the forearm support 300 (shown in FIGS. 7 and 8), and a dorsal quick-connect nipple 422 or a thumb quick-connect nipple 426 on the hand support 400 (shown in FIGS. 9 and 10). The forearm, dorsal, and thumb quick-connect nipples 310, 422, and 426 are described in further detail below. The strut 200 may come in different lengths to accommodate therapeutic supports which are used with the arm bent, such as the forearm support 300, or with the arm extended, such as the hand support 400, or alternatively to better accommodate users of different anatomical proportions.

Referring to FIGS. 7 and 8, the forearm support 300 comprises a rigid gutter plate 302 which cradles the medial or ulnar side of the user's forearm and an elbow loop 304 fixed to the gutter plate 302, which encircles the user's bent elbow, supporting the user's upper arm and helping to prevent the user's forearm from shifting proximally in the forearm support 300 when in use. The gutter plate 302 comprises a raised therapeutic surface 306 running over substantially the center of the gutter plate 302 and preferably further comprises a protruding ulnar therapeutic tool 308 substantially parallel with the user's ulna. The therapeutic surface 306 and ulnar therapeutic tool 308 contact the patient's body when the forearm support 300 is used and target the application of pressure to the patient's body. The gutter plate 302 is preferably lined with a forearm pad 316 for the user's comfort.

The forearm support 300 further comprises a forearm connection means mounted to the gutter plate 302. Preferably the forearm connection means comprises a forearm quick-connect nipple 310 rigidly mounted along a medial edge 312 of the gutter plate 302, proximate to the midpoint of the gutter plate 302. A rigidly mounted forearm quick-connect nipple 310 is preferred over the thoracic ball joint 112 used on the thoracic support 100 in order to ensure that pressure is applied directly and efficiently through the strut 200 and gutter plate 302 to the ulnar therapeutic tool 308, and thereby to the patient. A rigid mounting is also preferable to reduce the potential for misapplication of pressure to the patient resulting from a joint shifting while the user leans into the support apparatus 10. While the illustrated embodiments show the forearm quick-connect nipple 310 mounted along the medial edge 312 of the gutter plate 302, in some embodiments it may be advantageous to mount the forearm quick-connect nipple 310 along a lateral edge 314 of the gutter plate 302 instead.

The forearm support 300 preferably further comprises one or more forearm straps 318, best seen in FIG. 1, to securely but removably attach the forearm support 300 to the user's forearm. The forearm straps 318 may comprise one or more fastening means, such as buckle hooks 320 as shown in FIGS. 7 and 8, hook-and-loop fasteners, side-release buckles, camming buckles and the like. In some embodiments, the straps 318 may be elastic.

Referring back to FIG. 1, to use embodiments of the support apparatus 10 comprising the forearm support 300, the user attaches the thoracic support 100 to his or her chest and underarm region using the harness 110. Next, the user bends his or her elbow to approximately 90 degrees and inserts his or her forearm into the forearm support 300, using the straps 318 to fasten the forearm support 300 into position. The user then extends the strut 200 and uses the female quick-connect fittings 202 of the strut 200 to couple the strut 200 to the thoracic support 100 using the thoracic quick connect nipple 118 and to couple the strut 200 to the forearm support 300 using the forearm quick-connect nipple 310. The exact sequencing of the aforementioned steps of donning and coupling the various components of the support apparatus 10 together is not important; depending upon each user's anatomical proportions and dexterity, the user may find it more advantageous to perform these steps in a different order. Once the support apparatus 10 is donned and assembled, the user uses his or her arm and forearm to position the ulnar therapeutic tool 308 over the portion of the patient's anatomy to which he or she wishes to apply pressure. The user can then lean some or all of his or her body weight onto the thoracic support 100. The force of the user's body weight portion is transferred from the thoracic support 100 through the strut 200 to the forearm support 300 and thereafter applied to the patient, instead of being transferred down the user's arm. During or between pressure application the user may use his or her arm and forearm to reposition the ulnar therapeutic tool 308 over a new portion of the patient's anatomy. The thoracic ball joint 112 permits the user to intermittently or continuously reposition the forearm support in several modes of movement, including, but not limited to, forward and back, side-to-side, and circular movements.

Figure 11:
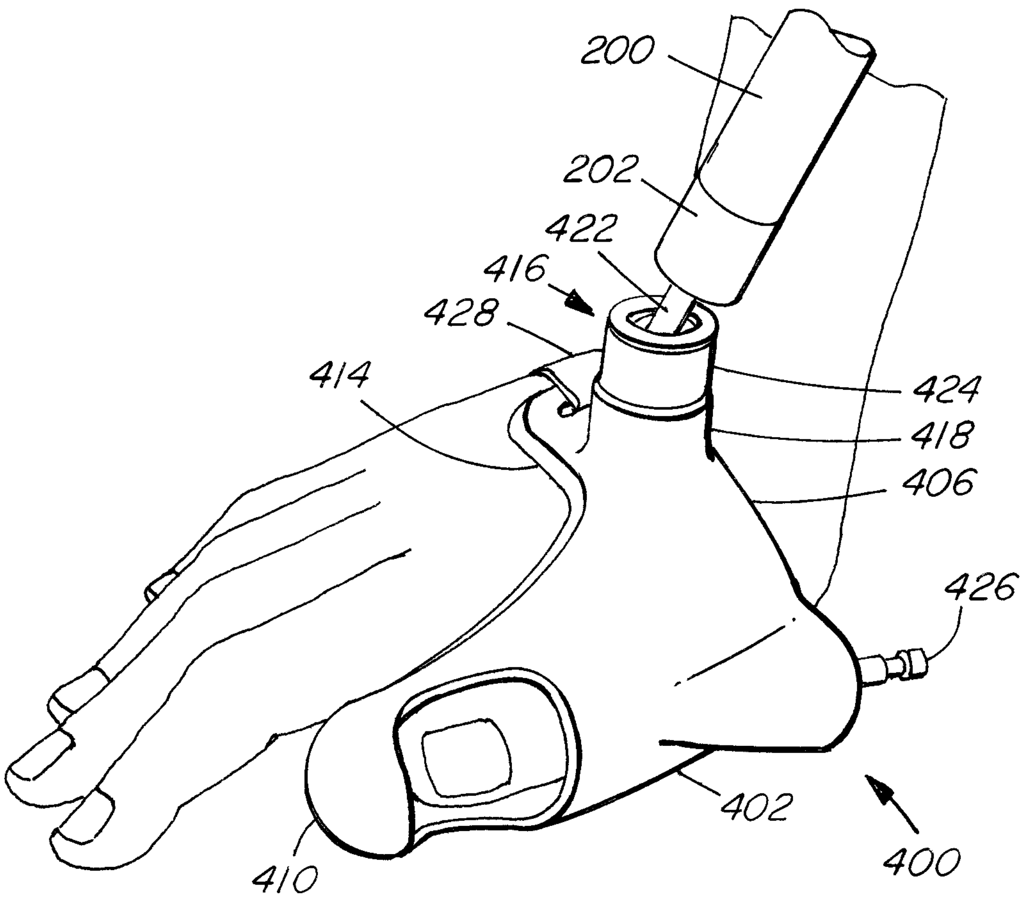
FIG. 11 is a detailed perspective view of the hand support and a portion of the strut of the support apparatus of FIG. 2.
Figure 12:
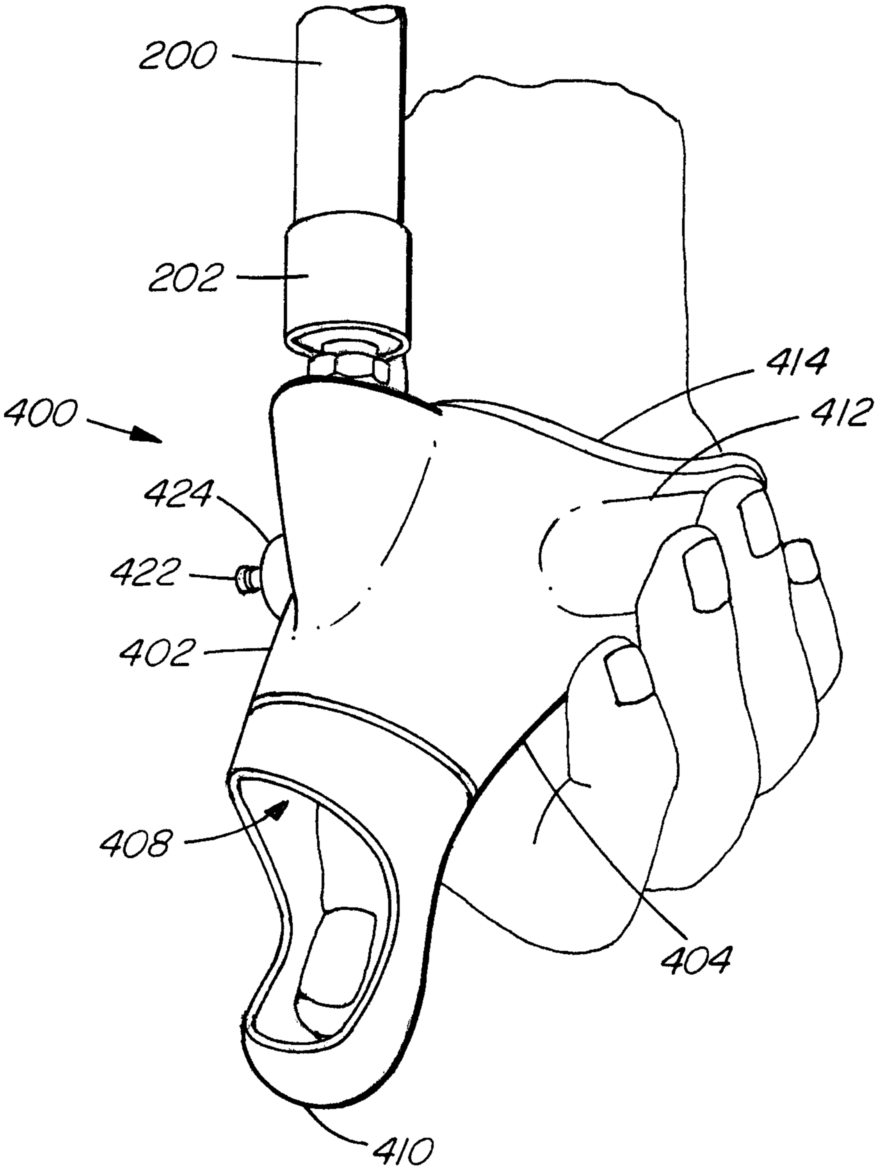
FIG. 12 is a detailed perspective view of the hand support and a portion of the strut of the support apparatus of FIG. 3.

Referring to FIGS. 9-12, the hand support 400 comprises a brace plate 402 having a palmar face 404 and a dorsal face 406. A thumb aperture 408 is formed through the brace plate 402, allowing the user's thumb to protrude through the brace plate 402. A thumb splint tool 410 is preferably mounted over the thumb aperture 408. The thumb splint tool 410 may partially or completely enclose the user's thumb. The palmar face 404 of the brace plate 402 preferably further comprises a protruding palmar therapeutic tool 412. The hand support 400 operates in a palmar mode when the user applies pressure to the patient through the palmar therapeutic tool 412, as shown in FIGS. 2 and 11, and operates in a thumb mode when the user applies pressure to the patient through the thumb splint tool 410, as shown in FIGS. 3 and 12. The brace plate 402 is preferably lined with a hand pad 414 for the user's comfort.

The hand support 400 preferably substantially stabilizes and immobilizes the user's thumb carpometacarpal joint (i.e. base of the thumb), reducing the potential for injury of that joint, particularly when the hand support 400 is being used in the thumb mode.

Preferably, at least two connection means are provided on the hand support 400 to allow the user to selectively use the hand support 100 in either of the palmar mode or the thumb mode. A hand ball joint 416 is preferably disposed on the dorsal face 406 of the brace plate 402 and comprises a hand socket 418 and a hand ball shank 420 terminating in a dorsal quick-connect nipple 422. By connecting the dorsal quick-connect nipple 422 to one of the female quick-connect fittings 202 of the strut 200, the hand support may be used in the palmar mode as shown in FIGS. 2 and 11. As with the thoracic ball joint 112, the hand ball joint 416 preferably further comprises a second locking collar 424, which, by tightening, clamps the hand socket 418 around the hand ball shank 420 to fix dorsal quick-connect nipple 422, and the strut 200 connected to the dorsal quick-connect nipple 422, at a pre-selected angle relative to the hand support 400.

A thumb quick-conned nipple 426 is preferably rigidly attached to the brace plate 402 between the palmar face 404 and the dorsal face 406 and points in substantially the opposite direction as the thumb aperture 408 and thumb splint tool 410. By connecting the thumb quick-connect nipple 426 to one of the female quick-connect fittings 202 of the strut 200, the hand support 200 may be used in the thumb mode as shown in FIG. 3.

The hand ball joint 416 is the preferred connection means for using the hand support 400 in the palmar mode because it allows the user to use more of the wide range of motion of his or her wrist to reposition the hand support 400 while and between delivering pressure to the patient. In contrast, the rigid thumb quick-connect nipple 426 is the preferred connection means for using the hand support 400 in the thumb mode because it efficiently and directly transfers force from the strut 200 through the brace plate 402 to the thumb splint tool 410. A ball joint could be used, but since the thumb splint tool 410 has a significantly smaller area of contact with the patient, the thumb splint tool 410 delivers comparatively higher pressure to the patient. Accordingly, sudden and unexpected shifts in the connection between the strut 200 and the hand support 400 when operating in the thumb mode could potentially injure the patient by inadvertently directing this higher pressure into the patient's body away from the intended treatment area. Additionally, if a flexible coupling such as a ball joint was used for connecting the hand support 400 to the strut 200, then the user's wrist would be partially engaged to stabilize the connection, which would increase the user's susceptibility to repetitive stress injuries or an acute soft tissue injury if the connection were to suddenly shift.

At least one hand strap 428, best seen in FIGS. 3 and 11, is preferably provided on the hand support 400, wrapping around the medial edge of the user's hand to releasably secure the hand support 400 to the user's hand. As with the harness 110 and forearm straps 318, the hand strap 428 may be elastic, and various fastening means may be provided for adjustability, including, but not limited to, hook and loop fasteners, buckles, and the like.

Referring back to FIGS. 2 and 3, to use embodiments of the support apparatus 10 comprising the hand support 400, the user dons the thoracic support 100 using the harness 110 and fastens the hand support 400 to the user's hand using the hand strap 428. Next, the user couples the strut 200 to the thoracic support 100. Based on the type of manual therapy the user wishes to perform, the user then couples the strut 200 to either the dorsal quick-conned nipple 422 to operate in the palmar mode or to the thumb quick-conned nipple 426 to operate in the thumb mode. If at any time the user wishes to change from the palmar mode to the thumb mode (or vice versa) he or she can simply disconnect the strut 200 from the dorsal quick-conned nipple 422 and reconnect the strut 200 to the thumb quick-connect nipple 426 (or vice versa).

When operating in the palmar mode, the user can reposition the hand support 400 using his or her arm and wrist, Once the hand support 400 and palmar therapeutic tool 412 are in the desired position on the patient, the user can then lean some or all of his or her body weight onto the thoracic support 100. This body weight force is transferred from the thoracic support 100 to the hand support 400 through the strut 200 and from there the body weight force is applied as pressure to the patient through the palmar therapeutic tool 412.

When operating in the thumb mode, the user uses his or her arm to reposition to the hand support 400, as the user's wrist will be substantially immobilized by the rigid connection between the strut 200 and the hand support 400. Once the hand support 400 and thumb splint tool 410 are in the desired position on the patient, the user can then lean some or all of his or her body weight onto the thoracic support 100. This body weight force is transferred from the thoracic support 100 to the hand support 400 through the strut 200 and from there the body weight force is applied as pressure to the patient through the thumb splint tool 410.

In some embodiments, the thumb splint tool 410 is removable, allowing the user to selectively apply pressure using his or her own thumb while still bracing the user's thumb carpometacarpal joint, thereby reducing potential for injury but allowing for the increased dexterity of the user's digits over the rigid thumb splint tool 410.

In some embodiments, the support apparatus 10 comprises the thoracic support 100, strut 200, forearm support 300 and hand support 400. The forearm support 300 and hand support 400 may be unitary, but it is preferable that they remain separate components, or are at most flexibly coupled, to allow the user a wider range of wrist motion when using the hand support 400 in the palmar mode. In these embodiments, the user is able to rapidly switch between various therapeutic modes, for example by decoupling the strut 200 from the forearm support 300 (optionally completely decoupling the strut 200 entirely and replacing with a longer strut) and coupling the strut to either of the thumb quick-connect nipple 426 or dorsal quick-connect nipple 422 on the hand support 400. This leads to increased efficiency over the duration of a manual therapy session.

In some embodiments, the chest plate 102 covers substantially all of the user's chest. In other embodiments, a thoracic support 100 further comprises a second chest plate positioned over the opposing side of the user's torso. In all of these embodiments, the thoracic support 100 comprises a second thoracic ball joint mounted over the opposing side of the user's chest from the first thoracic ball joint 112. This allows a significantly wider range of operating modes for the user. For example, the user could use both arms at once, with both using the same therapeutic support (e.g. two forearm supports 300, two hand supports 400, etc.), using different therapeutic supports for each arm, or both using a hand support 400 but in different modes (e.g. left hand in palmar mode, right hand in thumb mode). Alternatively, the user could use a second strut 200 connected to the same therapeutic support, either by having additional quick-connect fittings on the support itself or by having a female-male y-shaped quick-connect coupler, to apply significantly higher amounts of therapeutic pressure more comfortably.

In some embodiments, the ulnar therapeutic tool 308, palmar therapeutic tool 412, and thumb splint tool 410 comprise additional protrusions to enhance the manual therapy by providing localized areas of high pressure. These protrusions could include, but are not limited to, ridges, bumps, cones, pyramids, and spikes, distributed randomly or in an array across the surface of the tool.

In some embodiments the ulnar therapeutic tool 308, palmar therapeutic tool 412, and thumb splint tool 410 comprise different materials than the gutter plate 302 or brace plate 402 respectively. For example, the tool material may be resilient and pliable or even soft, such as a rubber or coated high density foam. In some embodiments, the tool material may be textured to mimic the feel of human skin for the patient. In other embodiments, the tool material may be selected to reduce friction between the tool and the patient's skin, such as a polished ceramic, metal, or polymer.

In some embodiments, the hand support 400 may comprise one or more digital splint tools instead of or in addition to the thumb splint tool 410. Each digital splint tool may cover and stabilize one or more of the user's fingers (for example, the index finger). In other embodiments, the digital splint tool comprises a gauntlet that covers all of the user's fingers. In some embodiments, the hand support 400 is used in a digital mode (that is, using a digital splint tool) by connecting it to the strut 200 using the thumb quick-connect nipple 426. In other embodiments, additional rigid quick-connect nipples are provided on the dorsal face 406, substantially aligned with the respective digital splint tool.

In some embodiments, the ulnar therapeutic tool 308 is removable from the gutter plate 302. Modular ulnar therapeutic tools of different shapes, texturing, and materials can be installed in place of the default ulnar therapeutic tool 308 in the gutter plate 302 to provide for a wider flexibility in treatment modes. In some embodiments, the thumb splint tool 410 and palmar therapeutic tool 412 are likewise modular.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A support apparatus for manual therapy, the support apparatus comprising:
- a thoracic support;
- a forearm support, said forearm support comprising an ulnar therapeutic surface; and
- a strut interconnecting said thoracic support to said forearm support, said strut having a longitudinal axis that extends through said forearm support when projected beyond an end of said strut.

2. The support apparatus of claim 1 wherein said thoracic support is configured to temporarily attach to a torso of a user, proximate to an axilla of said user.

3. The support apparatus of claim 2 wherein, when a force is applied from said torso of said user to said thoracic support, said force is transferred through said strut and said forearm support to said ulnar therapeutic surface.

4. The support apparatus of claim 3 wherein said ulnar therapeutic surface comprises an ulnar therapeutic tool.

5. The support apparatus of claim 3 wherein said force is a portion of a body weight of said user.

6. The support apparatus of claim 4 wherein said force is transferred through said forearm support to said ulnar therapeutic tool.

7. The support apparatus of claim 1 wherein said forearm support is configured to temporarily attach to a forearm of a user.

8. The support apparatus of claim 1 wherein said ulnar therapeutic surface comprises an ulnar therapeutic tool.

9. The support apparatus of claim 1 wherein said strut releasably connects to said thoracic support.

10. The support apparatus of claim 1 wherein said thoracic support comprises a thoracic ball joint.

11. The support apparatus of claim 10 wherein a first end of said strut connects to said thoracic ball joint.

12. The support apparatus of claim 11 wherein said first end of said strut releasably connects to said thoracic ball joint.

13. The support apparatus of claim 1 wherein said strut releasably connects to said forearm support.

14. The support apparatus of claim 1 wherein said forearm support comprises an elbow loop.

* * * * *